June 23, 1970  J. E. HAM ET AL  3,516,308
POWER PIPE TONG TRANSMISSION ASSEMBLY
Filed Dec. 4, 1967  9 Sheets-Sheet 1

INVENTORS.
JOHN E. HAM
MERRILL K. WILLSEY
BY
ATTORNEY

FIG. 4.

INVENTOR
JOHN E. HAM
MERRILL K. WILLSEY
BY
C. D. Stallings
ATTORNEY

United States Patent Office 3,516,308
Patented June 23, 1970

1

3,516,308
POWER PIPE TONG TRANSMISSION ASSEMBLY
John E. Ham and Merrill K. Willsey, Long Beach, Calif., assignors to Byron Jackson Inc., Long Beach, Calif., a corporation of Delaware
Filed Dec. 4, 1967, Ser. No. 687,815
Int. Cl. B25b 17/00
U.S. Cl. 81—57.16       14 Claims

ABSTRACT OF THE DISCLOSURE

A power pipe tong having a pipe gripping head adapted to be driven in opposite pipe-gripping and rotating directions by a power transmission mechanism which is adapted to drive the head at high speed and low torque for spinning pipe joints, and at low speed and high torque for making up and initially breaking out the pipe joints, the drive means including a slip clutch for absorbing shock loads when the pipe joints are initially shouldered at high speed.

Background of the invention

The present invention relates to power pipe tongs and more particularly to power pipe tongs of the type employed for making up well drilling pipe or casing by initially spinning one of the drill pipe tool joints or casing coupling parts at a relatively high speed during which the torque requirement is low, but the drive being adapted to operate at a low speed with high torque output after the tool joints or casing parts have initially shouldered.

In the running of well, pipe into a well bore, particularly in the running of drill pipe, it is the practice to hold a length of pipe disposed in the well bore against rotation and to spin the length of pipe suspended in the derrick at a relatively high rate of speed to effect engagement of the threads in the box and on the pin of the drill pipe joint, and thereafter to apply a high torque to the joint so as to make the joint up tight after the tool joint has initially shouldered.

In the operation of power tongs for spinning and making up drill pipe joints, it has been found to be desirable that the power tong be driven at high speed and low torque during the spinning operation, and at low speed and high torque after the tool joint has shouldered, and accordingly various power mechanisms have been provided for a dual-speed drive of power drill pipe tongs.

Summary

An object of the present invention is to provide a power transmission mechanism for power pipe tongs which is particularly advantageous in the making up of drill pipe tool joints, but which is also applicable to the breaking out of drill pipe tool joints, as well as to making up and breaking out of other well pipe joints such as well casing or tubing.

More particularly an object of the present invention is to provide a power transmission for power pipe tongs wherein selectively operable high speed-low torque and low speed-high torque power output may be derived from a single power input by means of the selective driving engagement and disengagement of one or the other of a pair of gears with a common shaft by the selective engagement of one or the other of a pair of remotely operable clutches.

Another object is to provide in a selectively operable dual-speed drive in accordance with the preceding objective, a slip clutch connection between the high speed, low torque gear train and the output shaft of the transmission, so as to absorb high shock loads which would otherwise be applied to the transmission bearing when the drill pipe tool joints initially shoulder.

Brief description of the drawings

FIG. 3b is a view in vertical section also as taken on the line 3—3 of FIG. 1, illustrating the power input assembly and the intermediate drive means between the tong head of FIG. 3a and the power transmission means;

FIG. 4 is a fragmentary view in horizontal section as taken on the line 4—4 of FIG. 3a;

FIG. 5 is a fragmentary view in horizontal section as taken on the line 5—5 of FIG. 3a;

FIG. 6 is a fragmentary view in horizontal section as taken on the line 6—6 of FIG. 3a;

Description of the preferred embodiment

Figure 1:
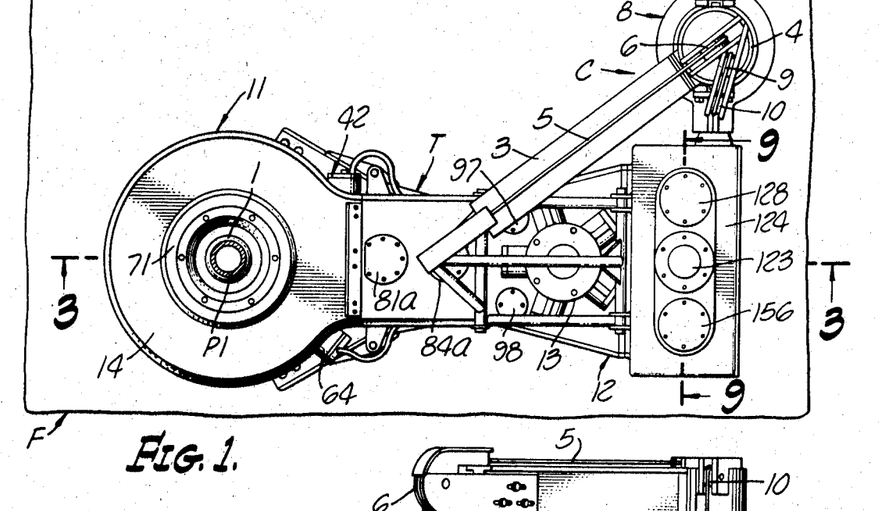
FIG. 1 is a top plan view illustrating a tong assembly including a transmission mechanism made in accordance with the invention.
Figure 2:
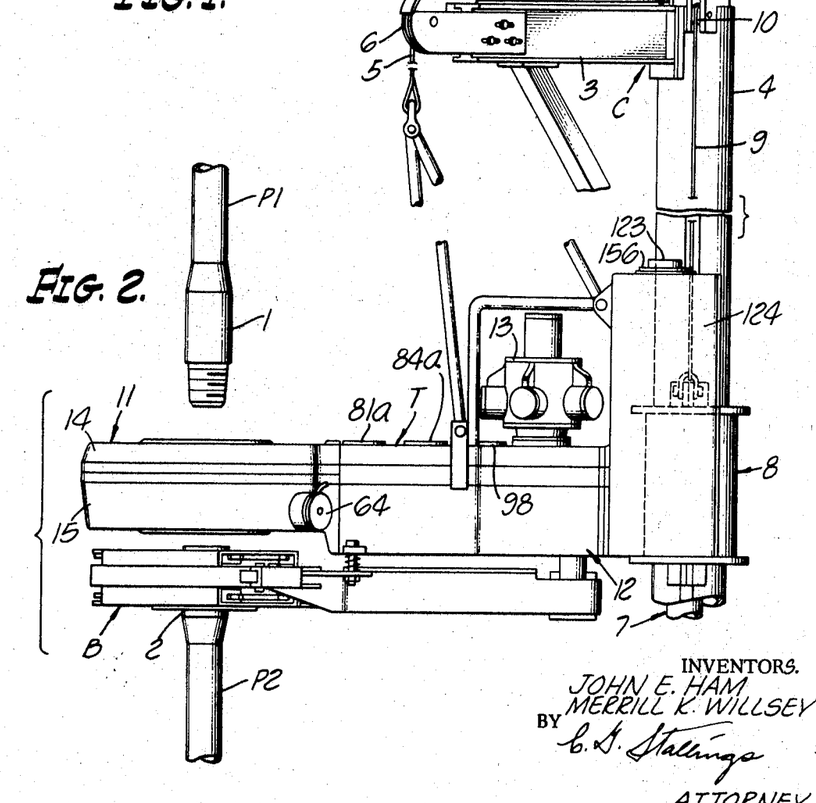
FIG. 2 is a view in side elevation of the assembly of FIG. 1.

Referring first to FIGS. 1 and 2, there is generally illustrated a tong assembly T adapted to be supported above the floor F of a drilling platform which may be part of the usual drilling rig mounted above a well bore and into which pipe, such as drill pipe or casing, is adapted to be run and from which such pipe will be sometimes pulled, as in the case of drill pipe. Such a pipe is illustrated in FIGS. 1 and 2 as including an upper stand of pipe P1 in the illustrative form of a stand of drill pipe having a tool joint pin end 1 thereon adapted to be threadably connected by the tong T to the box end 2 of a length or stand of the pipe P2 disposed in the well bore. In order to support the tong assembly T in a operative position above the well bore so that the stand of pipe P1 may be lowered therethrough for engagement with the pipe P2, a suitable crane C is provided, including a boom 3 projecting from a vertically extended post 4. A cable 5 extends over sheaves 6, 6 and is connected to a pressure operated cylinder mechanism 7 disposed within the post 4, whereby the tong assembly T may be raised and lowered relative to the post 4 and thereby relative to the well bore into which or from which pipe is being removed. Also forming a part of the crane C is a rabbit 8 slidable vertically along the post 4, there being a second cable 9 also connected to the upper end of cylinder 7, extending over a sheave 10, and connected also to the rabbit 8 so that the mass of the tong assembly may be properly supported.

The tong assembly, as is typical of tongs of the type here involved, includes a head section generally denoted at 11 and a supporting and power transmission section generally denoted at 12. The latter section in the illustrative embodiment has a hydraulic motor 13 adapted to be connected to a suitable source of motive fluid under pressure so as to drive the transmission mechanism of the tong assembly.

The tong head, as will hereinafter be described, is adapted to grip and effect rotation of the pin end 1 of the pipe P1, while the box end 2 of the pipe P2 is held nonrotatively in a back-up tong generally denoted at B. This back-up tong may be of any desired construction, but is preferably made in accordance with the disclosure in the application for United States Letters Patent filed concurrently herewith and entitled Back-Up Tong for Power Pipe Tongs, Ser. No. 687,810.

The tong head assembly may be of any desired type but is preferably constructed in accordance with the disclosure in the application for United States Letters Patent filed concurretly herewith and entitled Pipe Tong Head, Ser. No. 687,830.

Referring now more particularly to FIGS. 3a–8, the tong head assembly will be seen to comprise a frame structure including a horizontally split case having an upper case section 14 and a lower case section 15 joined as by fasteners 16 and connected at 17 to power transmission section 12 of the tong assembly. The case provides an internal annular space 18 in which is revolvably disposed what, as will hereinafter appear, may be characterized as a pipe engaging and rotating head including an inner ring assembly 20 and an outer ring assembly 21 which are supported one relative to the other for relative rotation of the rings as well as for rotation of the rings as a unit within the tong case.

The inner ring 20 comprises a box-like structure comprising an outer annular wall 22, an upper wall 23 and a bottom wall 24. Supporting the inner ring for rotation within the case is an annular bearing 25 and, at the upper side of the inner ring is an annular bearing 26 on which is revovably disposed the outer ring 21, an additional annular bearing 27 being provided between the upper case section 14 and the outer ring 21. The outer ring 21 is adapted to be driven by a gear 28 which constitutes the driven gear of the transmission mechanism powered by the motor 13, hereinafter to be more fully described, to rotatively drive the gear 28. This gear 28 constitutes means for driving rotatively the outer ring 21 and, therefore, the latter is provided with teeth 29 in mesh with the teeth of gear 28. The inner ring 20 is provided with pipe gripping means operable in response to rotation of the outer ring 21 relative to the inner ring 20, such pipe gripping means being best illustrated in FIGS. 3a, 4 and 5.

Figure 3A:
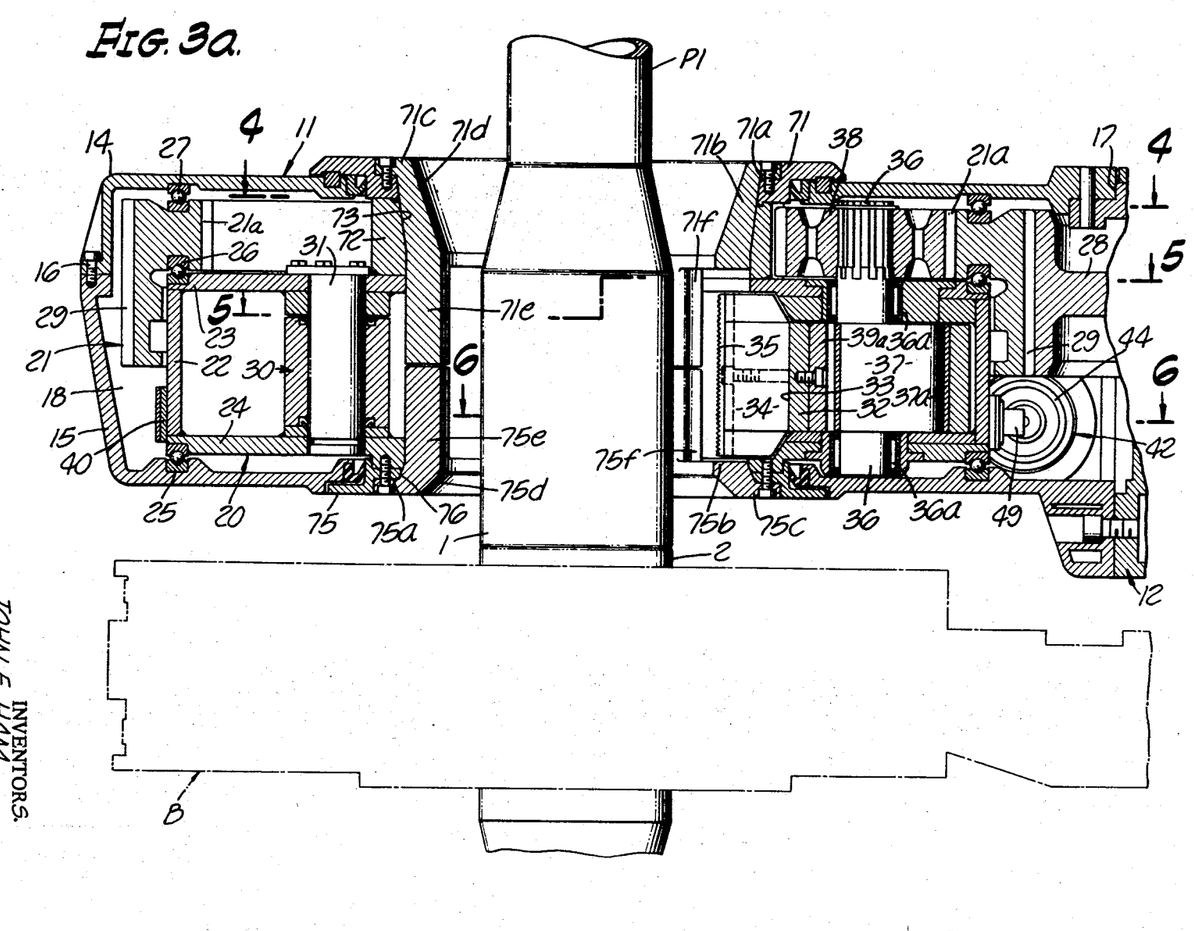
FIG. 3a is a fragmentary view in vertical section through the tong head of the assembly of FIGS. 1 and 2 as taken on the line 3—3 of FIG. 1.

In the illustrative structure now being described, the pipe gripping means include a plurality of circumferentially spaced jaws 30 in the form of levers pivotally supported on vertical pins or shafts 31 which are, as seen in FIG. 3a, supported between the inner ring top and bottom walls. Jaw 30 has an enlarged end section 32 provided with a dovetailed slot 33 adapted to receive a pipe gripping die carrier 34, in which may be removably disposed a typical tong die 35 adapted to grip the pipe or tool joint 1, previously referred to, upon pivotal movement of the jaws 30 toward one another about their respective pivot pins 31. The die carriers 34 may range in size, that is in thickness between the base of the slot 33 and the gripping jaws of the die 35, so that the assembly is adapted to effectively grip pipe over a wide range of sizes, from relatively small diameter drill pipe tool joints to much larger casing.

Means are provided for effecting inward movement of the jaws 30 as well as outward movement of the outer ring 21 relative to the inner ring 20. In the present embodiment, such means is so constructed as to require substantially a minimum outside diameter in the tong head assembly, so as to substantially minimize the gross weight of the tong head, so as to facilitate utility of the tong assembly on drilling rigs having space limitations, and so as to facilitate the manipulation of the tong assembly during its use. Such manipulation of the tong assembly in a typical installation would involve the periodic raising and lowering of the tong assembly by the crane C between a lower position, not shown, at which the tool joint 2 of FIG. 2 would extend upwardly through the toug assembly so as to be engaged by an elevator, on the one hand, and an upper position at which the tool joint 2 of the pipe P2 will be engaged by the back-up tong B and held stationary as the tong head 11 is operated to make up a pipe joint comprising the tool joints 1 and 2. Thus it will be apparent that the tong assembly will be shifted between these two positions many times during the running of a string of drill pipe, which may be thousands of feet long, composed of short stands of the pipe. Moreover, inasmuch as the supporting mechanism, including the crane which supports the tong assembly in operative position, must be at all times out of the way when the elevator is moving pipe into and out of the hole, it will be recognized that the tong head should preferably be as light as possible, offering no more than the necessary weight hanging over the hole and requiring constant manipulation.

Figure 4:
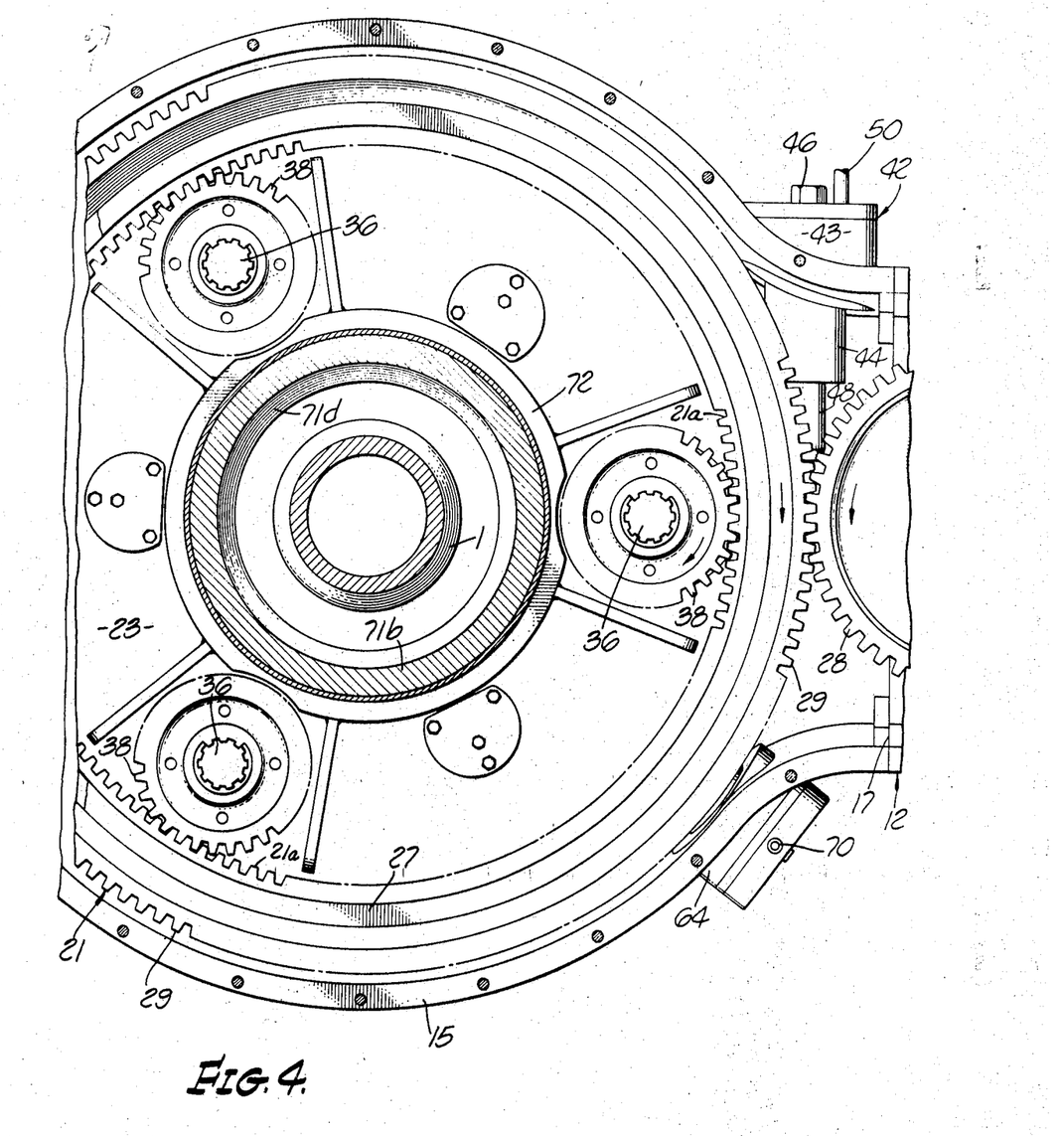

Accordingly, the jaw actuating mechanism comprises, for each jaw, a shaft 36 journaled in the upper and lower walls 23 and 24 of the inner ring 20 and having thereon an eccentric 37 disposed in an elongated slot 39 in the respective jaws 30. If desired, the slot 39 may be provided with a wear pad 39a engageable by the eccentric 37. It will be appreciated upon reference to FIGS. 5 and 6 more particularly, in which the jaws 30 are shown in retracted positions, that rotation of the shafts 36, and therefore the eccentrics 37, in either direction will cause inward pivotal movement of the jaws 30 toward the pipe or joint located within the tong head. Means are provided for effecting such pivotal movement including, as best seen in FIGS. 3a and 4, gears 28 splined or otherwise connected to each of the shafts 36 and in mesh with internal teeth 21a provided in the outer ring 21. It will now be apparent that rotation of the outer ring 21 will effect simultaneous rotation of each of the gears 38 with resultant rotation of the eccentric supporting shafts 36, provided that a drag be applied to the inner ring assembly so that the inner ring will not initially rotate along with the outer ring 21.

Figure 5:
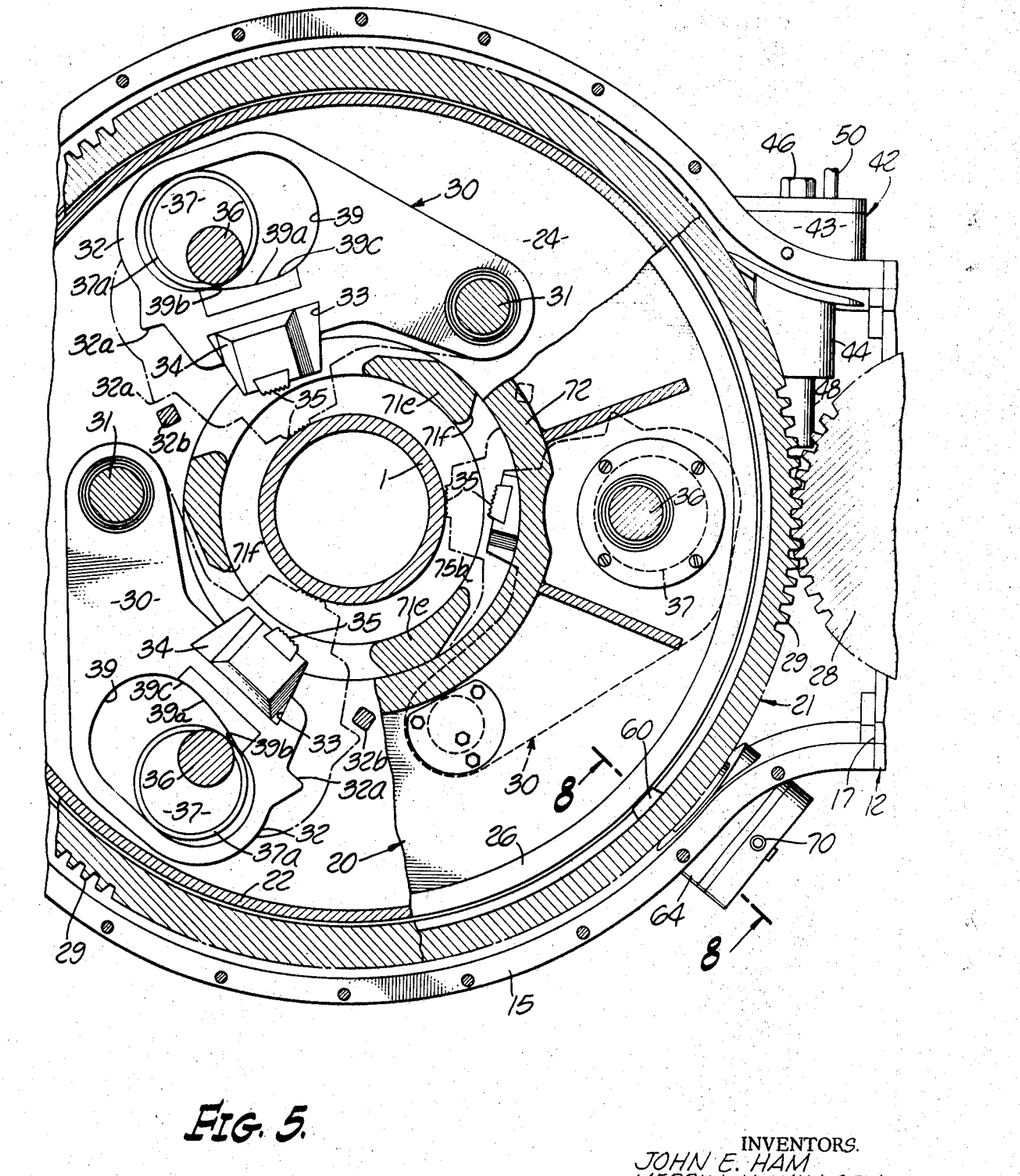
Figure 6:
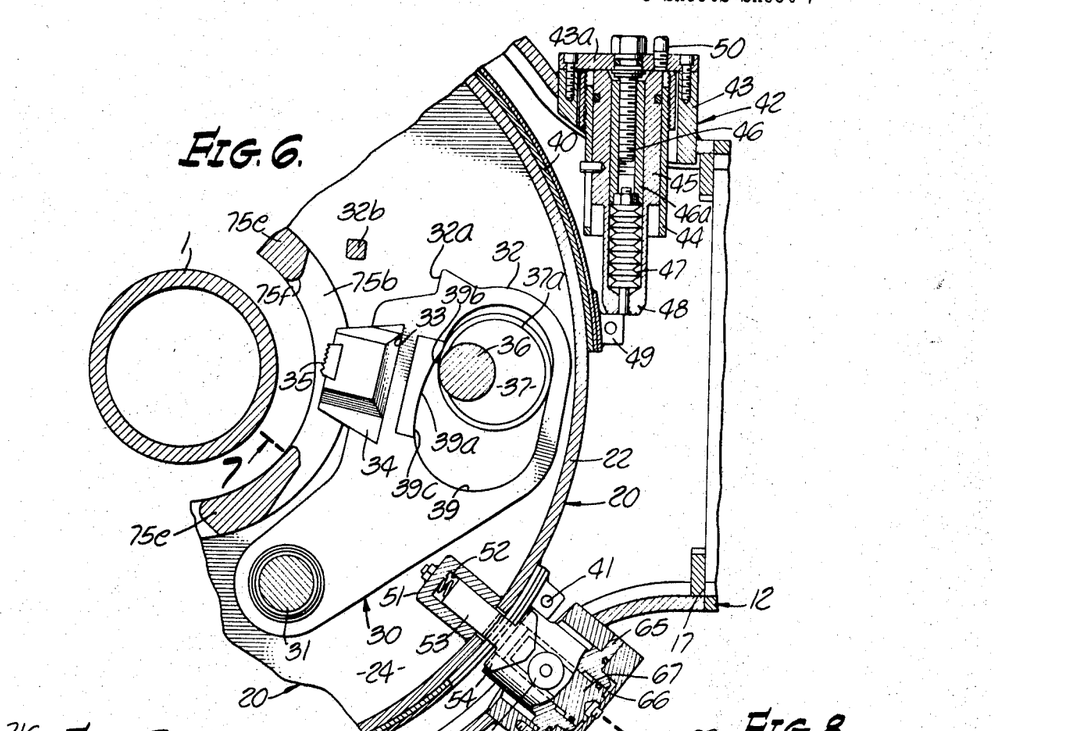

As shown in FIGS. 3a, 5 and 6, means are provided whereby to minimize frictional resistance to the forceable pivotal movement of the jaws 30 into gripping engagement with the pipe. Accordingly, each of the eccentrics 37 is provided with an annular member 37a in the illustrative form of a bushing which constitutes a bearing rotatably mounted upon the body of the eccentric 37. In addition, the eccentric supporting shafts 36 are rotatably supported in bearings 36a. With such a construction, the eccentric will revolve within the bushing 37a which will rotatably engage the surface of the wear pad 39a.

The wear pad 39a is so constructed as to enable the application of a substantially uniform radial force to the pipe gripping jaws, both in making up and breaking out pipe joints, notwithstanding the fact that the jaws 30 swing about the pivot supports 31 so as to normally tend to vary the effective cam angle between the eccentric 37 and the wear pad 39a when the eccentric is caused to revolve in opposite directions. More specifically, the wear pad 39a is provided with an arcuate cam surface which progressively declines from its outer extremity towards the pivot end of the jaws 30. Included in the surface of the wear pad 39a is a first portion 39b and a second portion 39c, the eccentric 37 acting on the portion 39b when rotated in a left-hand direction to effect closure of the respective jaws, and the eccentric 37 working on the portion 39c upon right-hand rotation of the eccentric to effect closure of the respective jaws. Rotation of the eccentrics 37 past the juncture of the camming surface portions 39b and 39c in either direction commences the reopening of the jaws, and therefore the die carriers 34 and dies 35 should be selected so as to effect gripping engagement with a pipe before the eccentrics 37 reach their position of maximum throw. When die carriers 34 are selected which will effect such gripping engagement of the pipe just prior to the point at which the eccentrics reach the position of maximum throw, the greatest radial force will be imposed on the jaws for the purpose of effecting high torque in making up and initial breaking out of pipe joints.

Means are provided for applying a drag to the inner ring 20, including a brake band 40 engaged with the outer annular wall 22 of the inner ring and suitably anchored as at 41 to the case section 15. In the illustrative head, means are provided for applying more or less braking force to the brake band 40, such means comprising, as best seen in FIG. 6, a brake actuator mechanism generally denoted at 42. This mechanism includes a supporting body 43 welded or otherwise made a part of the tong case and having therein a hydraulic actuator, including a cylinder 44 in which is reciprocally disposed a piston 45. Carried by the body 43 and revolvable in an end closure 43a is a brake adjuster screw 46 threadedly engaged in a hollow tube 46a disposed within a bore in the piston 45. This hollow tube 46a engages a stack of Belleville washers 47 constituting a spring engaged at one end with the tube 46a and at the other end with a piston extension 48, the extension 48 being welded or otherwise suitably connected to the anchor 49 at the other end of the brake band 40 from the anchor 41 whereby to maintain a normal constant braking force on the inner ring 20 sufficient to normally prevent rotation of the inner ring along with the outer ring 21, whereby, under normal circumstances, the rotation of the outer ring will cause actuation of the jaws 30 into and out of engagement with the pipe in response to reversals in the direction of rotation of the outer ring 21. In the event that additional braking force is necessary or desirable in order to establish or maintain a pipe gripping action, fluid under pressure may be supplied to the actuator cylinder 44 through a conduit 50 from a source of fluid pressure (not shown).

When the inner ring 20 is held stationary, the normal tendency of the jaw actuating means would be to move the jaws inwardly during the first 180° of revolution of the eccentrics 37 until the dies 35 engage a pipe in the central tong opening or, in the absence of such a pipe, to move the jaws inwardly during the first 180° of rotation of the eccentrics 37 and then retract the jaws cyclically and the inner ring 20, under these circumstances, would not rotate with the outer ring 21. In the presence of a pipe within the tong opening, the eccentrics 37 will move the jaws into engagement with the pipe during rotation of the outer ring 21 in one direction but, when it is desired to reopen the jaws, it is necessary to rotate the outer ring 21 in the opposite direction, the eccentrics 37, due to the fact that they are acting on the walls of the elongated slots 39, retracting the jaws.

Stop means are provided to prevent cycling of the jaw actuation. This stop means includes reversing stop means which will function to limit relative rotation of the inner and outer rings in one direction or the other, depending upon whether joints are being made up or broken out, to a position at which the jaws are fully opened. This stop means also includes, in the illustrative embodiment, stop means for preventing movement of the jaws inwardly in the event that no pipe joint is present between the jaws. This latter stop means cooperates with the reversing stop means so as to eliminate the possibility that, for example, a joint which has been made up will be re-engaged by the jaws as a result of cycling of the eccentric means and cause the joint to be partially broken out.

Figure 7:
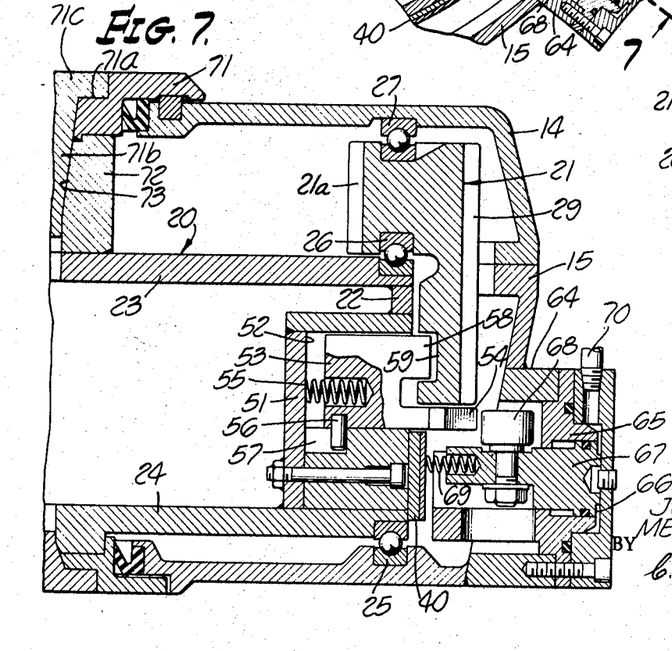
FIG. 7 is a fragmentary vertical sectional view as taken on the line 7—7 of FIG. 6.
Figure 8:
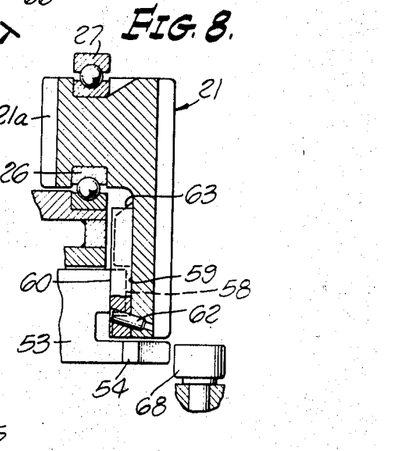
FIG. 8 is a fragmentary view in vertical section as taken on the line 8—8 of FIG. 5.

More particularly, the reversing stop means is best illustrated in FIGS. 6, 7 and 8. The reverse latch means includes a latch support 51, recessed in the outer wall 22 of the inner ring 20 and providing a chamber 52 in which is reciprocably disposed a stop body 53 having a V-shaped outer extremity 54 normally biased outwardly by a spring 55 to a position underlying the lower extremity of the outer ring 21. A pin 56 carried by the body 53 and sliding in a slot 57 is adapted to limit outward projection of the stop body. The stop body 53 has a further outward projection 58 which normally extends into an inner groove 59 in the outer ring 21. Cooperative with the outward projection 58, as best seen in FIG. 8, is a stop anvil 60 carried by the outer ring 21 and extending vertically across the just-mentioned groove 59, the anvil being retained in place within the outer ring 21 by a pin 62 and by angularly spaced lugs 63 between which the anvil is fit. It will now be apparent that the anvil will abut with the stop projection 58 at one side or the other of the latter, depending upon the direction of relative rotation between the inner and outer rings 20 and 21, respectively. In operation, however, it is desired that during the making up of pipe joints the anvil be at one side of the stop projection 58 so as to limit relative rotation between the inner and outer rings to a position at which the jaws are open, while during the operation of breaking out joints of pipe it is desired that the anvil normally be at the other side of the stop projection 58. Accordingly, means are provided for shifting the stop body 53 inwardly to retract the stop projection 58 from groove 59 in the outer ring, whereby to allow the anvil 60 to pass by the stop projection 58. The means for shifting the stop body 53 comprises means which are remotely operable and, in the illustrative embodiment, includes an actuator cylinder body 64 carried by the tong head frame and having an internal piston support 65 providing a piston chamber 66, in which is reciprocable a piston 67. This piston 67 supports a roller 68, and spring means 69 are provided for normally biasing the piston 67 outwardly in the chamber 66. However, the roller 68 is located at an elevation relative to the outward projection 54 of the stop body 53 such that, upon inward movement of the piston 67, the roller will be contacted by the projection 54 to force the stop body 53 inwardly in its chamber 52, thereby retracting the stop projection 58 out of the path of the stop anvil 60. Such inward movement of the piston 67 is accomplished by the application of fluid pressure to the piston chamber 66 through a conduit 70 leading from a source of fluid pressure at a remote location (not shown). In the normal operation of the tong assembly, the stop anvil 60 will be at a starting position adjacent one side of the stop projection 58 when pipe joints are to be broken out, so that the outer ring 21 will be free to rotate relative to the inner ring 20 to the extent necessary to effect actuation of the jaws 30, as aforesaid, into engagement with a pipe disposed in the tong opening and, thereafter, the inner and outer rings will rotate together as a unit, overcoming the drag of the brake band 40. When it is desired to release the pipe or open the jaws, and the outer ring 21 is caused to rotate in the opposite direction, the anvil 60 will re-engage the stop projection 58 and cause rotation of the inner and outer rings together when the jaws are in the full open position.

In order to assure that the jaw actuating eccentric 37 cannot cycle in the absence of a pipe within the tong opening, thereby allowing movement of the stop anvil 60 away from the stop projection 58 a distance greater than that required to effect inward movement of the jaws the maximum extent, the jaws are provided with stop projections 32a engageable with a stop member 32b to limit the maximum inward pivotal movement of the jaws, this stop member 32b being in the form of a bar or rod straddling the box-like inner ring assembly and welded or otherwise fixed in place.

It will now be understood that, inasmuch as with the stop means just described, namely the stop elements 32a and 32b, the jaws are prevented from moving inward to such an extent that the eccentrics 37 may pass over their positions of maximum throw; the outer ring 21 will be prevented from rotating relative to the inner ring 20 to such an extent that the jaw actuating eccentrics will cause reclosure of the jaws upon a pipe in the tong opening when the jaws are being opened. Thus, a pipe joint which has been made up cannot possibly be partially broken out inadvertently, and vice versa.

In order to protect the assembly and to assist in the guiding of the pipe P1 into the central tong opening, an upper guide is provided comprising a flange 71 positioned above the case section 14 and having a skirt 72 extending into the case and providing a tapered guide surface 73, whereby the pipe P1 will be guided into the tong opening as the pipe is lowered into a position for engagement of the jaws with the pipe or the tool joint pin end 1. The flange 71 and the guide member 72 are welded or otherwwise made a part of the inner ring 20 and a seat is provided at 71a adapted to accommodate reduced diameter guides of different sizes which will serve to guide smaller diameter pipes and centralize them relative to the tong opening so as to protect the jaws and die holders carried thereby, which extend more or less into the tong opening when die holders of different radial dimensions are employed for handling different sizes of pipe. A reduced guide is herein illustrated whereby the die carriers 34 will be protected, such reduced guide comprising a body 71b having an upper flange 71c adapted to seat in the seat 71a the body 71b having an internal taper 71d, and the body also having depending arms 71e which define windows 71f through which the jaws may pass for engagement of the pipe disposed within the tong opening. Another flange 75 is disposed beneath the tong assembly and provides a guide surface 76 to assist in guiding a pipe upwardly into the tong opening, as well as a seat 75a adapted to accommodate lower guides of smaller size. A similar reduced bottom guide is illustrated and includes a body 75b having a bottom flange 75c seating in the seat 75a of the bottom guide, the body 75b also having a tapered surface 75d, as well as upwardly extended arms 75e defining windows 75f. The arms 71e and 75e are disposed in alignment, as are the windows 71f and 75f, whereby the pipe joints are prevented from moving laterally while disposed in the tong opening into positions at which they might otherwise hang up upon the guide bodies.

In the normal operation of the tong assembly when it is desired to make up pipe joints, the pipe P2 will be engaged and held stationary by the back-up tong B and the pipe P1 will be lowered or stabbed into the pipe P2. Thereupon, fluid pressure will be supplied to the motor 13 to drive the outer ring 21 in a right-hand direction, thereby, through the intermediary of the planetary gears 38 causing rotation of the eccentric shafts 36 and inward movement of the jaws about their pivots 31 until the tong dies engage the tool joint pin end 1, rotation of the jaw carrying inner ring along with the outer ring being prevented by the brake band 40 until the jaws tightly grip the pipe, at which time the inner and outer rings will rotate together to effect rotation of the pipe. After the pipe joint has been made up the motor 13 will be reversed causing rotation of the outer ring 21 in a left-hand direction as the brake band 40 holds the inner ring 20 stationary. Such relative rotation will cause the jaws to be opened and will cause the stop anvil 60 to engage stop projection 58, thereby resulting in unitary rotation of the inner and outer rings to the left with the jaws in the full open position. The operation may be repeated until it is desired to break out a joint of pipe. In order to enable this latter operation, fluid under pressure will be supplied to the reverse stop actuator chamber 66 causing retraction of the stop projection 58 from the groove 59 in the outer ring 21 and, at the same time, the motor will be operated to drive the outer ring 21 in a left-hand direction so as to move the stop anvil 60 past the stop projection 58. Due to the presence of the secondary stops 32a and 32b, relative rotation of the outer ring and the inner ring in this direction is limited to a distance less than a full cycle of the eccentrics 37, inasmuch as the jaws are prevented from moving inwardly by engagement of stop 32a with 32b; and, when the direction of rotation of the outer ring is again reversed to reopen the jaws, the rings will rotate again together when the stop anvil 60 re-engages the stop projection 58 respectively carried by the outer ring and the inner ring. Thus, the tong head is conditioned for breaking out joints.

Figure 3C:
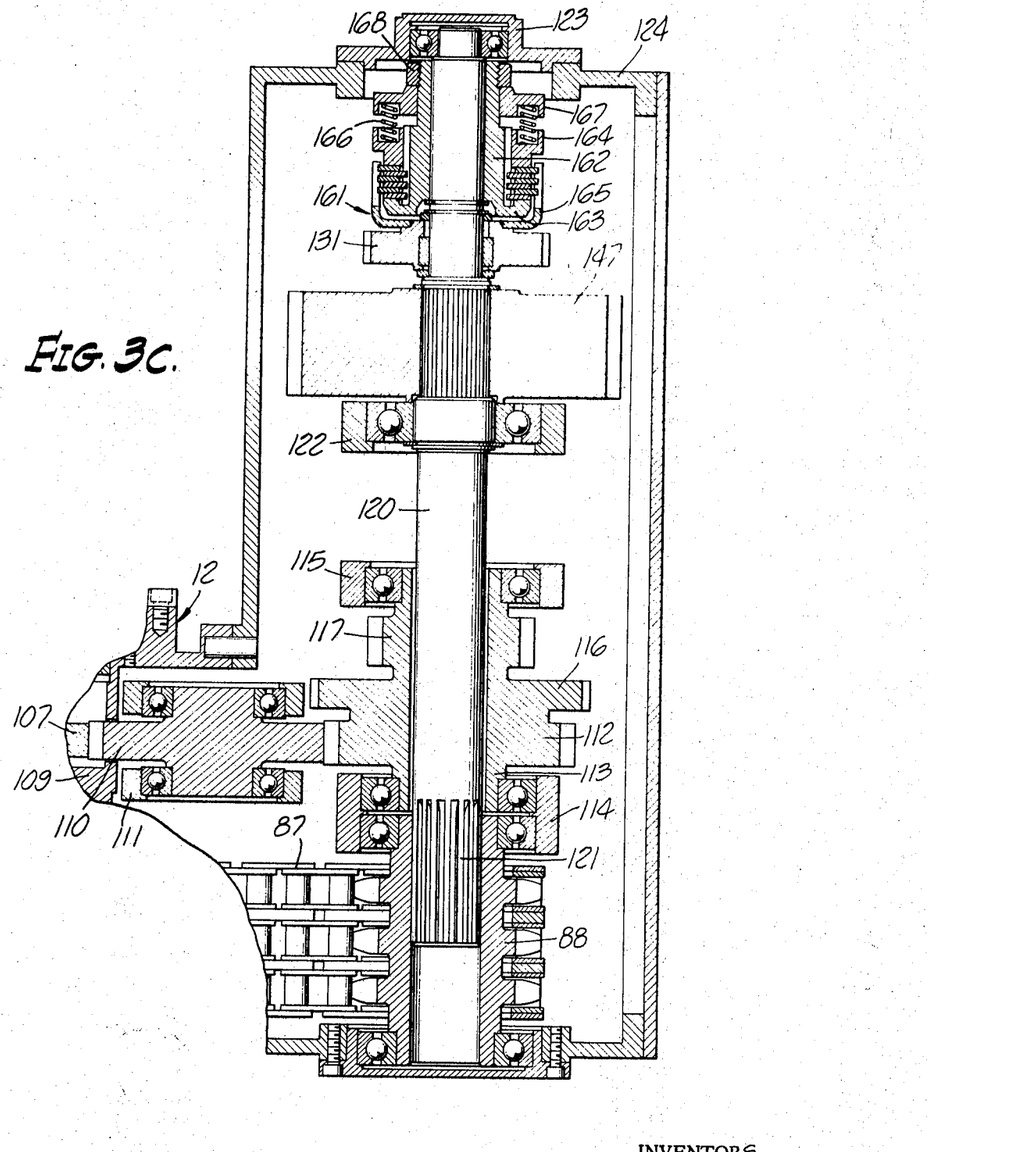
FIG. 3c is a view in vertical section also taken on the line 3—3 of FIG. 1 showing the transmission mechanism for varying the drive between the power input and the intermediate drive of FIG. 3b.
Figure 9:
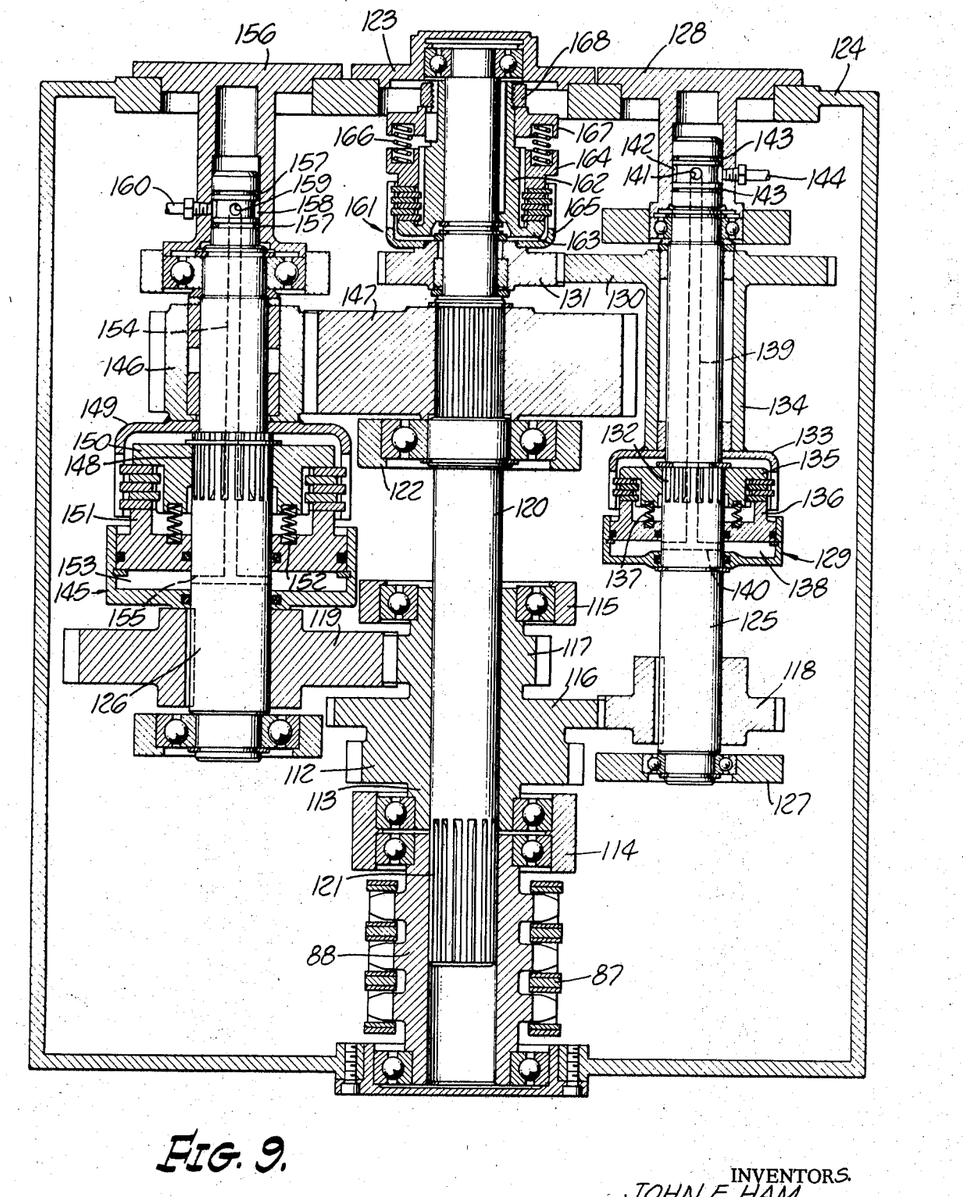
FIG. 9 is a view in vertical section as taken on the line 9—9 of FIG. 1 through the transmission mechanism of the invention.
Figure 10:
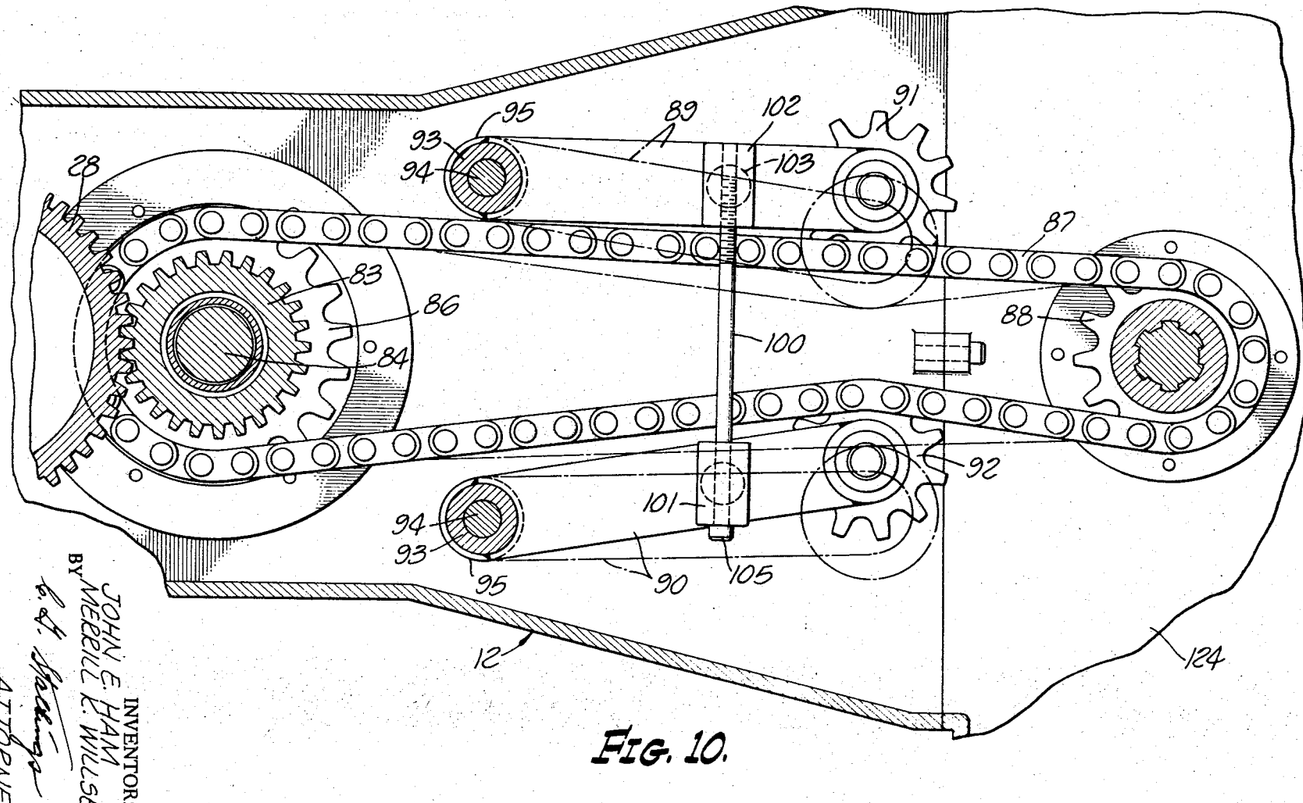
FIG. 10 is a fragmentary view in horizontal section as taken on the line 10—10 of FIG. 3b.

The means for driving the tong mechanism as thus far described are best illustrated in FIGS. 3b, 3c, 9 and 10. Referring first to FIG. 3b, it will be noted that the upper and lower tong case sections 14 and 15 are connected to horizontally extended case sections 14a and 15a which house an intermediate drive section, generally denoted 80, including the motor 13. This intermediate drive section includes the drive gear 28 previously described which is in mesh with the large outer ring gear 21, the gear 28 being an idler gear journaled upon a shaft of which is supported in a shaft supported 82 mounted in the lower case section 15a and having an enlarged end 81a connected to the upper case section 14a. In mesh with the idler gear 28 is a gear 83, the hub of which is journaled upon a shaft 84 which is also supported in a shaft support 85 provided in the lower case section 15a, the upper end of shaft 84 having an enlarged end 84a connected to the upper case section 14a. Formed as a unit with the gear 83; that is, having a hub common with the hub of gear 83, is a sprocket 86 having a plurality of sprocket sections adapted to be driven by chain means 87. This chain means 87 preferably comprises a series of unitized chains respectively engaged with the sprocket sections. As best seen in FIGS. 3c and 10, the chain means 87 extends about a sprocket 88 which is also of the multiple sprocket section type and which forms a part of a change speed transmision mechanism, which will hereinafter be more fully described, and the chain means 87 extends about the sprockets 86 and 88 in a continuous or endless loop.

As best seen in FIG. 10, the endles loop of chain 87 is engaged by means whereby, as will hereinafter appear, the unloaded run of chain will be held taut and as the direction of drive through the intermediate drive mechanism 80 is reversed, the opposite unloaded run of chain will be held taut by an adjustable and automatically shiftable slack adjuster mechanism. This slack adjuster mechanism comprises a pair of similar lever arms 89 and 90, each having at their free ends idler sprockets, respectively designated 91 and 92. Levers 89 and 90 are provided with hubs 93 fulcrumed on pins 94 which are disposed in bosses 95 provided in the lower case section 15a, the upper end of pin 94 being supported in a boss 96 extending downwardly from a supporting enlargement 97 secured to the upper case section 14a. The lever 90 is supported similarly at its upper end in a boss carried by an enlargement 98 supported by the upper case section 14a. Like lever 89, the lever 90 has a multiple sprocket section engaged with the chain means 87.

The means for loading the levers 89 and 90 toward one another so as to take up slack in the non-working run of the chain means 87 comprises a tie rod 100. The opposite ends of the tie rod 100 are disposed in blocks 101 and 102, each of which blocks has a cylindrical projection 103 therebelow extending through an opening in the respective levers 89 and 90 and retained in place as by snap ring 104. At one end of the tie rod 100 is an abutment in the illustrative form of a head 105, adapted to be engaged by a suitable tool for rotating the tie rod 100, the other end of the rod being threadedly engaged in the other block 102 so as to enable adjustment of the distance between the levers 89 and 90 by revolution of the head 105, with resultant revolution of the rod 100. It will now be understood that the relationship between levers 89 and 90 may be adjusted to apply more or less tension to the chain means extending between the pulleys 86 and 88, and that inasmuch as the levers are respectively freely pivotal about their supports, the working run of the chain means will extend in a straight line between the opposite sprockets 86 and 88 while the slack will be taken up in the non-working run of the chain means, as best seen in FIG. 10 wherein the slack adjuster means is shown in a condition in which the sprocket 88 is being driven in a righthand direction whereby, through the chain means 87, sprocket 86, gear 83, gear 28 and outer ring gear 21, the inner ring 20 will be caused to actuate its jaws to grip and rotate a pipe in a righthand direction so as to make up a pipe joint. When a pipe joint is being broken out, the opposite run of the chain will be working and will extend in a straight line between the sprockets 86 and 88, while the other run of the chain will be deflected by the slack adjuster means.

The means for driving the sprocket 88 to effect such reversal of the operation of the tong mechanism comprises, as best seen in FIG. 3b, a power input gear 107 which is splined to the shaft 108 of the motor 13. Gear 107 is journaled in a bearing support 109 formed as a part of the upper case section 14a. An idler gear 110 journaled in a support 111 also formed as a part of the upper case section 14a, meshes with the drive gear 107 and also with the power input gear 112 of the change speed transmission mechanism. This input gear 112 has its hub 113 journaled in a lower support 114, the hub 113 extending upwardly and being journaled in a support 115 at its upper end. Integral with or otherwise made a part of the hub 113, is a large drive gear 116 and, spaced above the latter, a smaller drive gear 117 which are respectively, as seen in FIG. 9, in mesh with a high-speed gear 118 and low-speed gear 119. The power output from the transmission mechanism includes a central shaft 120 which is provided with a spline or other connection 121 with the above-described drive sprocket 88. This output shaft 120 extends rotatively through the hub 113 of gears 112, 116 and 117, and is journaled in a support 122 interiorly of the transmission case 124 as well as its upper end, in a bearing support 123 in the upper wall of the case.

In parallel relation to the output shaft 120 are drive shafts 125 and 126 on which are respectively mounted the high-speed gear 118 and the low-speed gear 119. The shaft 125 is journaled in an internal support 127 and in an upper end support 128 disposed in the upper wall of case 124. Means are provided for establishing a drive connection between the shaft 125 and the output shaft 120 when it is desired to drive the tong head at high speed and low torque, such as when pipe is being spun to initially make up a pipe joint or to spin a joint out, this means comprising a fluid-pressure actuated clutch mechanism, generally denoted at 129, which is adapted, when engaged, to drive a gear 130 which is normally freely journaled about the shaft 125 and which is in mesh with a gear 131 which is drivingly connected with the output shaft 120. The clutch means 129 may be of any desired fluid-pressure actuated type; in the illustrative embodiment, the clutch means 129, for illustrative purposes, will be seen to include a drive member 132 keyed to the shaft 125 and a driven member 133 welded or otherwise suitably connected to a downwardly extended hub section 134 of gear 130. The clutch drive member 132 has a plate 135 opposing an actuator piston 136, and between the plate 135 and piston 136 is a stack of co-engageable friction plates, alternate plates of which are driven by the drive member 132 and carried by the driven clutch member 133 in the usual manner. A number of springs 137 are interposed between the drive member 132 and the piston 136 normally biasing the latter away from the plate 135 so that the clutch is normally disengaged. Means are provided for admitting fluid under pressure to a piston chamber 138 behind piston 136, so as to force the latter in a clutch-engaging direction. In the illustrative embodiment the shaft 125 has a central fluid passage 139 leading downwardly therethrough to a suitable number of radial ports 140 leading between the passage 139 and the piston chamber 138. At its upper end the passage 139 communicates with a suitable number of ports 141 formed in the upper end of the shaft 125 and communicating with a pressure fluid chamber 142 defined between appropriate sealing means 143 within a bore provided in the support 128. Fluid under pressure may be supplied to the clutch 129 by a conduit 144 leading from a suitable source of pressure fluid (not shown) which is under the control of an operator at a remote location. Thus, when the operator desires that the tong assembly be driven through shaft 125, clutch means 129, gear 130, gear 131 and output shaft 120, the operator will cause the application of fluid pressure to the clutch 129. During this time the low-speed gear 119 will idle, as will be apparent from the following description of the low-speed drive.

This low-speed drive is provided with another fluid-pressure operated clutch means 145 which, when engaged, will establish a driving connection between the low-speed gear 119 and a gear 146 journaled about the low-speed shaft 126 and engages with a large gear 147 which is keyed or otherwise connected to the output shaft 120. The clutch 145, like clutch 129, may be of any desired type and, also like clutch 129, is illustrated as including a drive clutch member 148 keyed to the shaft 126 and a driven clutch member 149 which is welded or otherwise connected to the gear 146. Clutch drive member 148 has a plate 150 opposed by a piston 151, and a stack of friction discs alternately connected to the drive member 148 and the driven member 149 are interposed between the plate 150 and the piston 151 so as to effect engagement of the clutch 145 and driving of the gear 146 by the shaft 126. A suitable number of springs 152 are provided for normally disengaging the clutch 145, and a pressure chamber 153 is provided behind the piston 151 to effect engagement of the clutch. Also, as in the case of the clutch 129, the shaft 126 is provided with a central passage 154, and radial ports 155 lead from the passage 154 into the piston chamber 153. At its upper end the shaft 126 is disposed in a shaft supporting member 156 carried by the upper wall of the transmission case 124, and suitable seals 157 isolate a chamber 158 which communicates with the passage 154 in shaft 126 through radial ports 159. Fluid under pressure may be admitted to the chamber 158 to actuate the clutch 145 through a suitable conduit 160 leading from a source of fluid under pressure at a remote location, and whereby the operator may, when desired, cause engagement of the clutch means 145 while the clutch means 129 is disengaged so as to effect a low speed drive from input gear 112 through gear 117 to gear 119 which will drive gear 146 through the clutch 145, so that gear 147 will then drive output shaft 120 and sprocket 88 at a relatively low rate of speed but at high torque.

In the making up of pipe joints, particularly drill pipe tool joints and drill collar joints, as is well known in the art, the threaded joints are normally relatively rotated at high speed, this being generally referred to as "spinning," and when the tool joint shoulders there is instantaneous shock loading of the drive mechanism due to the abrupt increased resistance to rotation. In accordance with the present invention means are provided for disconnecting the high speed-low torque drive from the output shaft 120 when such abrupt resistance is encountered so as to protect the high-speed drive from the effects of such instantaneous loading of the drive gears. As previously indicated, the high-speed output gear 131 is drivingly connected to the output shaft 120 but slip clutch means, generally denoted at 161, are provided for normally establishing a drive between the gear 131 and the output shaft 120, which drive will slip when subjected to instantaneous, heavy torque loads. The slip clutch means may be of any desired form, but is preferably a spring-loaded clutch, the spring-loading of which may be varied as may be required during operation of the tong assembly. The illustrative slip clutch means 161 comprises a drive member 162 keyed or otherwise suitably connected to shaft 120, and having a stationary plate 163. Opposing the stationary plate 163 is a pressure plate 164, and interposed between the pressure plate and the stationary plate is a stack of friction discs, of which alternate discs are connected to the clutch drive member 162 and to a clutch-driven member 165 which is welded or otherwise suitably connected to the gear 131. A suitable number of springs 166 engage the pressure plate 164 to normally load it towards the stationary plate 163 to normally hold the clutch in engagement. An annular spring seat 167 is disposed about the clutch drive member 162 in a position relative to the stationary clutch plate 163 determined by the relative axial adjustment of an adjuster collar 168 threadedly connected to the clutch drive member 162 and serving as an adjustable stop for the spring seat 167, whereby the effective spring force may be adjusted. It will be apparent that the upper shaft support 123 for the output shaft 120 may be removed from the upper wall of the transmission case 124 to afford access to the adjuster collar 168 when desired or necessary.

In the operation of the tong assembly including a power transmission mechanism as herein disclosed, it will now be understood that power fluid will be supplied to the motor 13 and actuating fluid for the clutch means 129 and 145 will be supplied thereto from a remote location by an operator who may control the direction in which the tong mechanism will be driven by reversing the flow of power fluid to the reversible motor 13, and who may select the drive to the tong head in either direction by either effecting engagement of the high-speed drive clutch means 129 or the low-speed drive clutch means 145. Thus when, for example, drill pipe is being run into a well, the operator will cause righthand rotation of the tong mechanism so that the outer ring 21 thereof will cause closure of the jaws 30 upon the tool joint 1 of the pipe P1, pursuant to which the tong head will rotate to the right at high speed until the tool joint 1 shoulders with the tool joint 2 of the pipe P2. Upon the shouldering of the tool joints 1 and 2 the slip clutch means 161 will allow the high-speed drive to slip so that the high-speed drive gears will not be adversely affected by the sudden resistance to further rotation. Thereupon the operator may cause the high-speed clutch means 129 to be disengaged and cause the low-speed drive clutch means 145 to be engaged so as to impose a high torque, low speed further rotation upon the tool joint 1 relative to the tool joint 2, so as to make the joint up tight.

Alternatively, if the pipe is being pulled from the well it will be understood that the operator will cause rotation of the tonging mechanism to the left through the low-speed torque drive to initially break out the tool joint; thereafter the operator may release the low-speed drive through clutch 145 and effect engagement of the high-speed drive through clutch means 129 so that the tool joint 1 will be rapidly rotated to disengage all of its threads from the tool joint 2 by a spinning action.

It will also be recognized that the reversal of rotation of the tong mechanism will cause a reversal of the direction of the drive between chain sprockets 86 and 88, thus causing alternately one or the other of the runs of the chain between the sprockets to be working while the other run is not working. The pivoted levers 89 and 90 which support the chain idler sprockets 91 and 92, respectively, in the case of such reversal of drive direction will automatically shift to apply a force on the slack side of the chain while allowing the working side of the chain to run in a straight line between the sprockets, resulting in increased chain and sprocket life.

While the specific details of the illustrative embodiment of the invention have been shown and described, changes and alterations may be made without departing from the spirit of the invention as defined in the appended claims.

We claim:

1. In a power tong assembly for making up and breaking out joints of pipe and including a supporting case structure; pipe gripping means carried by said case structure and operable upon rotation of said pipe gripping means in either direction to grip and rotate a threaded joint part relative to another threaded joint part, whereby to make up and break out joints composed of said joint parts; and reversible power transmission means for driving said gripping means in opposite directions; the improvement wherein said power transmission means comprises a reversible motor; a power output shaft; intermediate drive means connecting said output shaft and said pipe gripping means for driving the latter; and change speed transmission means for drivingly connecting said output shaft to said motor including selectively operable first and second drive means for connecting said motor to said output shaft; said first means including means for driving said output shaft at high speed and low torque; and said second means including means for driving said output shaft at low speed and high torque.

2. A power tong assembly as defined in claim 1 wherein said intermediate drive means includes a drive sprocket connected to said output shaft and a driven sprocket, a chain extended about said sprockets, and slack adjuster means for imposing a deflecting force on one run of said chain when said motor is running in one direction and on the other run of said chain when said motor is running in the other direction.

3. A power tong assembly as defined in claim 2, wherein said slack adjuster means includes a pair of levers, each of said levers having an idler sprocket; means supporting said levers for pivotal movement relative to said chain, and tie means interconnecting said levers for holding said levers in position with said idler sprockets in engagement with said runs of said chain.

4. A power tong assembly as defined in claim 2, wherein said slack adjuster means includes a pair of levers, each of said levers having an idler sprocket; means supporting said levers for pivotal movement relative to said chain, tie means interconnecting said levers for holding said levers in position with said idler sprockets in engagement with said runs of said chain, and means for adjusting said tie means to move said levers toward and away from one another to vary the loading on said chain.

5. A power tong assembly as defined in claim 1, wherein said first and second drive means each include normally disengaged clutch means and means for selectively effecting engagement of one of said clutch means while the other of said clutch means is disengaged.

6. A power tong assembly as defined in claim 1, wherein said change speed transmission comprises: a driven gear revolvable relative to said output shaft, a high-speed gear connected to said driven gear, a low-speed gear connected to said high speed and driven gears, a high-speed shaft driven by said high-speed gear, a low-speed shaft driven by said low-speed gear, a second high-speed gear revolvable relative to said high-speed shaft, a second low-speed gear revolvable relative to said low-speed shaft; clutch means for selectively drivingly connecting said second high-speed gear and said second low-speed gear to said high-speed and low-speed shafts, and gear means drivingly connecting said second high-speed gear and said second low-speed gear to said output shaft.

7. A power tong assembly as defined in claim 6, wherein said means drivingly connecting said second high-speed gear to said output shaft includes normally engaged slip clutch means.

8. A power tong assembly as defined in claim 6, wherein said means drivingly connecting said second high-speed gear to said output shaft includes normally engaged slip clutch means, said slip clutch means including means for adjusting its torque capacity.

9. A power tong assembly as defined in claim 6, wherein said means drivingly connecting said second high-speed gear to said output shaft includes normally engaged slip clutch means, said clutch means comprising a fluid pressure operated clutch having a drive member connected to the respective high and low speed shafts; a driven member connected to the respective second high speed and second low speed gears; clutch discs connected to the drive and driven members of the respective clutches, and fluid pressure operated actuator means for effecting coengagement of such clutch discs.

10. A power tong assembly as defined in claim 9, wherein said high-speed and low-speed shafts each have a fluid passage extending axially thereof communicating with said fluid pressure actuator of the respective clutches and including means for admitting fluid under pressure to said passages in said shafts from a remote location.

11. A power tong assembly as defined in claim 9, wherein said high-speed and low-speed shafts each have a fluid passage extending axially thereof communicating with said fluid pressure actuator of the respective clutches; said case structure having means supporting said high and low-speed shafts, including means forming with each shaft a pressure fluid inlet chamber communicating with said passages in said shafts.

12. In a power tong assembly for making up and breaking out joints of pipe and including a supporting case structure; pipe gripping means carried by said structure and operable upon rotation of said pipe gripping means in either direction to grip and rotate a threaded joint part relative to another threaded joint part, whereby to make up and break out joints composed of said joint parts; and reversible power transmission means for driving said gripping means in opposite directions; the improvement wherein said power transmission means comprises a reversible motor, a power output shaft; intermediate drive means connecting said output shaft and said pipe gripping means for driving the latter; change speed transmission means for drivingly connecting said output shaft to said motor including a transmission case carried by said case structure; a power output shaft disposed in said transmission case; a high-speed shaft and a low-speed shaft in said transmission case in parallel spaced relation to said output shaft; a driven gear revolvable about said output shaft and driven by said motor; high-speed gear means connecting said high-speed shaft to said driven gear; a high-speed clutch drive member connected to said high-speed shaft; a high-speed driven clutch member, friction means for establishing a drive between said high-speed clutch drive member and driven member; fluid-pressure-operated means for engaging said friction means; gear means connecting said high-speed clutch driven member to said output shaft; means for admitting fluid under pressure to said actuator means; low-speed gear means connecting said driven gear to said low-speed shaft, a low-speed clutch drive member connected to said low-speed shaft, a low-speed driven clutch member; friction means for establishing a drive between said low-speed clutch drive member and driven member; fluid-pressure operated means for engaging said latter friction means; gear means connecting said low-speed clutch driven member to said output shaft, and means admitting fluid pressure to said latter actuator means.

13. A tong assembly as defined in claim 12, including slip clutch means interposed in the drive between said high-speed shaft and said output shaft.

14. A power tong assembly as defined in claim 13, including slip clutch means interposed in the gear means connecting said high-speed clutch driven member to said output shaft.

References Cited

UNITED STATES PATENTS

| 3,261,241 | 7/1966 | Catland | 81—57.18 |
| 3,086,413 | 4/1963 | Mason | 81—57.16 |

FOREIGN PATENTS

| 1,150,630 | 6/1963 | Germany. |

JAMES L. JONES, JR., Primary Examiner

U.S. Cl. X.R.

81—57.18